United States Patent
Bermudez et al.

(10) Patent No.: US 10,410,056 B1
(45) Date of Patent: Sep. 10, 2019

(54) COMPUTER VISION BASED ASSET EVALUATION

(71) Applicant: Capital One Services, LLC, McLean, VA (US)

(72) Inventors: Sophie Bermudez, Washington, DC (US); Alexandra Colevas, Arlington, VA (US); Michael Saia, New York, NY (US); Kaylyn Gibilterra, New York, NY (US); Sarah J. Cunningham, Arlington, VA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/386,118

(22) Filed: Apr. 16, 2019

(51) Int. Cl.
*G06K 9/00* (2006.01)
*H04L 12/911* (2013.01)
*G06N 20/00* (2019.01)

(52) U.S. Cl.
CPC ......... *G06K 9/00664* (2013.01); *G06N 20/00* (2019.01); *H04L 47/781* (2013.01); *H04L 47/788* (2013.01)

(58) Field of Classification Search
CPC ........... G06K 9/00664; G06K 9/00335; G06K 9/00718; G06K 9/00744; G06K 9/00979; G06K 9/3233; G06K 9/685; G06K 2009/00738; G06N 20/00; H04L 47/781; H04L 47/788; G06Q 30/08; G06Q 40/04; G06Q 30/0601; G06Q 50/184
See application file for complete search history.

(56) References Cited

U.S. PATENT DOCUMENTS

| | | | | |
|---|---|---|---|---|
| 6,161,099 A | * | 12/2000 | Harrington | G06Q 30/08 705/36 R |
| 2002/0004775 A1 | * | 1/2002 | Kossovsky | G06Q 10/10 705/37 |
| 2007/0179878 A1 | * | 8/2007 | Kim | G06Q 30/08 705/37 |
| 2007/0208685 A1 | * | 9/2007 | Blumenau | G06F 16/907 |

(Continued)

OTHER PUBLICATIONS

Woodenbikes "How to Divide the Estate Fairly and Happily", https://www.instructables.com/id/How-to-divide-the-Estate-Fairly-and-Happily/, Apr. 12, 2010, 26 pages.

(Continued)

*Primary Examiner* — Mekonen T Bekele
(74) *Attorney, Agent, or Firm* — Harrity & Harrity, LLP

(57) ABSTRACT

A processing platform may receive a plurality of images. The processing platform may determine respective asset types of the plurality of assets based on a computer vision technique. The processing platform may determine respective estimated values of the plurality of assets based on the respective asset types. The processing platform may provide information identifying the respective estimated values of the plurality of assets to two or more recipients. The processing platform may receive allocation information. The processing platform may determine a selected allocation of the plurality of assets for the two or more recipients based on the allocation information and using a second model. The processing platform may perform one or more actions based on the selected allocation.

20 Claims, 10 Drawing Sheets

(56) References Cited

U.S. PATENT DOCUMENTS

| | | | | |
|---|---|---|---|---|
| 2007/0261072 A1* | 11/2007 | Boulet | ............... | G06Q 30/02 |
| | | | | 725/14 |
| 2010/0023371 A1* | 1/2010 | Hartz | ............. | G06Q 30/0601 |
| | | | | 705/310 |
| 2011/0055895 A1* | 3/2011 | Roskowski | ........... | H04W 4/02 |
| | | | | 726/3 |
| 2014/0297447 A1* | 10/2014 | O'Brien | ............. | G06Q 30/08 |
| | | | | 705/26.3 |
| 2016/0092980 A1* | 3/2016 | Hounsell | .............. | G06Q 40/06 |
| | | | | 705/26.3 |
| 2016/0110813 A1* | 4/2016 | Hayden | ............... | G06Q 40/06 |
| | | | | 705/36 R |

OTHER PUBLICATIONS

Paul Sullivan, "When Dividing Assets, the Little Things Matter", https://www.nytimes.com/2016/04/16/your-money/when-dividing-assets-the-little-things-matter.html, Apr. 15, 2016, 4 pages.

Fair Split, "Divide Things, Not Families", https://www.fairsplit.com/, Sep. 22, 2015, 6 pages.

\* cited by examiner

US 10,410,056 B1

COMPUTER VISION BASED ASSET EVALUATION

BACKGROUND

Computer vision is an interdisciplinary scientific field that deals with how computers can be made to gain high-level understanding from digital images or videos. Computer vision tasks include methods for acquiring, processing, analyzing and understanding digital images, and extraction of high-dimensional data from the real world in order to produce numerical or symbolic information.

SUMMARY

In some implementations, a method of wireless communication may include receiving, by a device, a plurality of images, wherein the plurality of images depict a plurality of assets; determining, by the device, respective asset types of the plurality of assets based on a computer vision technique, wherein the respective asset types are determined based on a first model that receives, as input, information determined based on the computer vision technique, and that outputs information identifying the respective asset types; determining, by the device, respective estimated values of the plurality of assets based on the respective asset types; providing, by the device, information identifying the respective estimated values of the plurality of assets to two or more recipients; receiving, by the device, allocation information, wherein the allocation information identifies bids or priority levels of the two or more recipients with regard to the plurality of assets; determining, by the device, a selected allocation of the plurality of assets for the two or more recipients based on the allocation information and using a second model, wherein the second model receives, as input, at least one of: the respective estimated values, or the allocation information, and wherein the second model outputs the selected allocation; and performing, by the device, one or more actions based on the selected allocation.

In some implementations, a device for wireless communication may include one or more memories and one or more processors operatively coupled to the one or more memories. The one or more memories and the one or more processors may be configured to receive a plurality of images, wherein the plurality of images depict a plurality of assets; determine respective asset types of the plurality of assets based on a computer vision technique; determine respective estimated values of the plurality of assets based on the respective asset types and using a first model; receive allocation information, wherein the allocation information identifies bids or priority levels of two or more recipients corresponding to the plurality of assets; determine a selected allocation of the plurality of assets for the two or more recipients based on the allocation information and using a second model, wherein the second model receives, as input, the respective estimated values and the allocation information, and wherein the second model outputs the selected allocation; and provide information identifying the selected allocation and the two or more recipients.

In some aspects, a non-transitory computer-readable medium may store one or more instructions for wireless communication. The one or more instructions, when executed by one or more processors of a device, may cause the one or more processors to: receive a plurality of images, wherein the plurality of images depict a plurality of assets; determine respective estimated values of the plurality of assets using a first model, wherein the respective estimated values are determined based on respective asset types of the plurality of assets, wherein the respective asset types are determined using a computer vision technique; receive allocation information, wherein the allocation information identifies bids or priority levels of two or more recipients corresponding to the plurality of assets; determine a selected allocation of the plurality of assets for the two or more recipients based on the allocation information and using a second model, wherein the second model receives, as input, the respective estimated values and the allocation information, and wherein the second model outputs the selected allocation; and provide information identifying the selected allocation and the two or more recipients.

DETAILED DESCRIPTION

Figure 1A:
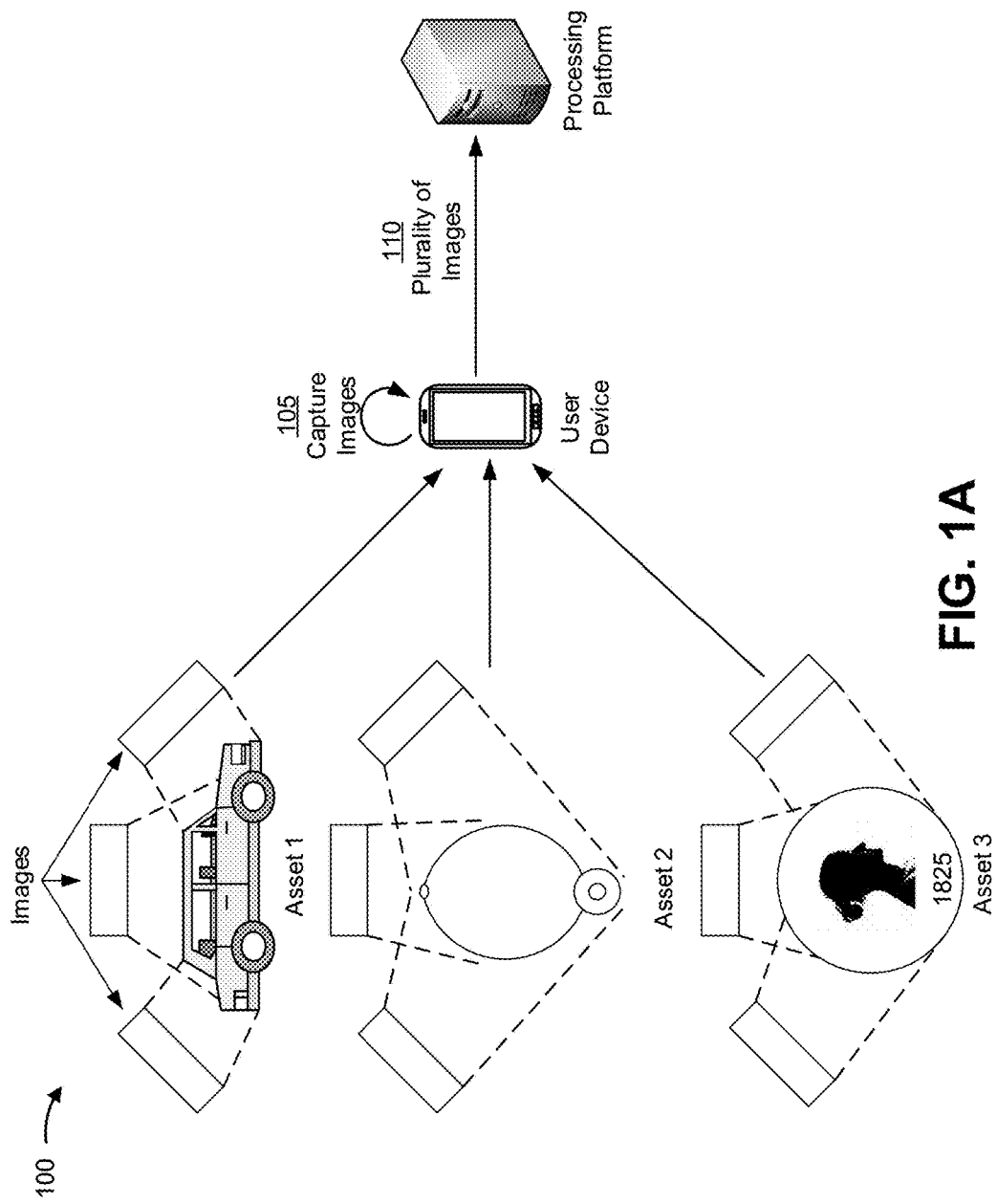
FIGS. 1A-1E are diagrams of an example implementation described herein.

The following detailed description of example implementations refers to the accompanying drawings. The same reference numbers in different drawings may identify the same or similar elements.

It may be desirable to allocate or distribute assets based on values of the assets. For example, an asset may include a good, real property, a financial asset, a natural resource, and/or the like. An allocation of assets to one or more accounts or recipients based on values of the assets may be referred to herein as an asset allocation. In some cases, an asset allocation may be determined based on various values of assets, such as monetary value (e.g., based on purchase cost, market value, replacement value, material value, and/or the like), a user-specified value (e.g., a quantification of a sentimental value, a user-specified estimate of a monetary value, a user-specified ranking of preference regarding which assets to be allocated, and/or the like), and/or the like. In some cases, an asset allocation may be determined by a computing device, such as a smart phone, a computer, and/or other computing devices described herein. For example, the computing device may determine the asset allocation based on monetary values, user-specified values, a combination of the above values, and/or other factors.

A user-specified determination of the value of an asset may be inefficient or inaccurate for a variety of reasons. For example, the user may lack subject matter expertise in asset valuation or may lack knowledge regarding an origin of an asset that would provide credibility for the user's estimate of the value of the asset. As another example, allowing a user to input a value of an asset may waste computer resources that are used to receive the input and may render the computing device vulnerable to errors by the user in determining or inputting the asset's value when performing the asset allocation.

Some implementations described herein provide the determination of a value of an asset using computer vision and machine learning. For example, a device may use computer vision to identify an asset and/or specific parts of an asset. Once an asset is identified using computer vision, a model trained using machine learning may be used to determine a value of the asset. Conventional machine learning techniques may not be suitable to properly value an asset due to the uniqueness of each asset and the limits of the inputs provided by computer vision. Implementations described herein provide a novel machine learning technique to train a model to determine a value of an asset. In some implementations, the device may provide a determination of whether a value of an asset is likely to be accurate if the value is determined using a computer vision or machine learning technique. If the value is unlikely to be accurate, then implementations described herein may provide information identifying the asset to an asset evaluator for determination of a value (e.g., a manual determination, a lookup-based determination, and/or the like). If the value is likely to be accurate, then implementations described herein may determine the value of the asset using one or more machine learning-based techniques described herein.

In this way, implementations described herein may conserve computational resources (e.g., processing resources and/or the like) that would otherwise be used to attempt a machine learning-based asset value determination for an asset that is unlikely to be accurately valued using the machine learning-based asset value determination. Furthermore, implementations described herein may conserve computing resources that would otherwise be used to receive and process user interactions identifying inaccurate asset values. Even further, several different stages of the process for asset value determination based on machine learning are automated, which may improve speed and efficiency of the process. Furthermore, implementations described herein use a rigorous, computerized process to perform tasks that were not previously performed. For example, previously, a technique did not exist to determine whether asset values can be accurately determined using a machine learning-based technique or to determine an asset value based on a machine learning-based technique.

FIGS. 1A-1E are diagrams of an example implementation 100 described herein. As shown in FIG. 1A, and by reference number 105, a user device may capture images of a set of assets (e.g., Asset 1, Asset 2, and Asset 3). Here, Asset 1 is a vehicle, Asset 2 is a piece of jewelry, and Asset 3 is a coin. In some implementations, an asset, as described herein, may include any object or property of which an image or video can be captured and for which an estimated value is to be determined. As used herein, the process of determining an estimated value of an asset, whether performed using a machine learning-based technique or by an asset evaluator, is referred to as evaluating the asset.

As shown, the images of the assets may be captured from multiple, different angles. In some cases, the user device may capture a video of an asset (e.g., from various angles, moving around the asset, etc.). In some implementations, the user device may generate a three-dimensional model of the asset. For example, the user device may combine multiple images or video segments to determine a three-dimensional model. The three-dimensional model may be useful for determination of an estimated value of the asset, as described in more detail below. In some implementations, a user device may capture an image based on an indication from a processing platform to capture the image. For example, the processing platform may determine that one or more existing images of an asset are insufficient for evaluating the asset (e.g., due to poor image quality, an insufficient view of the asset, and/or the like), and may request that the user device provide one or more additional images. In such a case, the user device may capture the one or more additional images and/or may prompt a user of the user device to capture the one or more additional images.

In some implementations, the user device may receive or determine context information for an image or a set of images. The context information may include any information associated with an image, a video, or an asset, such metadata for an image or video, a measurement associated with an asset (e.g., a size measurement and/or the like), chemical composition information for an asset, and/or the like. In some implementations, the user device may receive context information based on a user interaction. For example, the user device may receive information regarding an asset (e.g., an age of the asset, a time at which the asset was purchased, identifying information associated with the asset, a condition of the asset, a composition of the asset, or other user-specified information or sensor-captured information regarding the asset). The processing platform may use this information to determine an estimated value of an asset, as described in more detail elsewhere herein.

As shown by reference number 110, the user device may provide a plurality of images of the plurality of assets to a processing platform. In some implementations, the user device may provide the plurality of images with information identifying the plurality of assets. For example, the user device may provide a first set of images associated with Asset 1, may provide a second set of images associated with Asset 2, and so on. This may simplify the processing of the images by the processing device in comparison to an unstructured image upload. In some implementations, the user device may provide context information associated with the assets. In some implementations, the processing platform may receive images or video from multiple, different sources. For example, multiple user devices may provide images or video of one or more assets to the processing platform.

In some implementations, the user device may perform the operations described herein locally. For example, the user device may perform some or all of the operations described in connection with FIGS. 1A-1E and/or other operations described herein. Processing the images, determining asset types, and determining estimated values at the user device may reduce latency associated with these operations, whereas the processing platform may provide increased processing power and scalability.

Figure 1B:
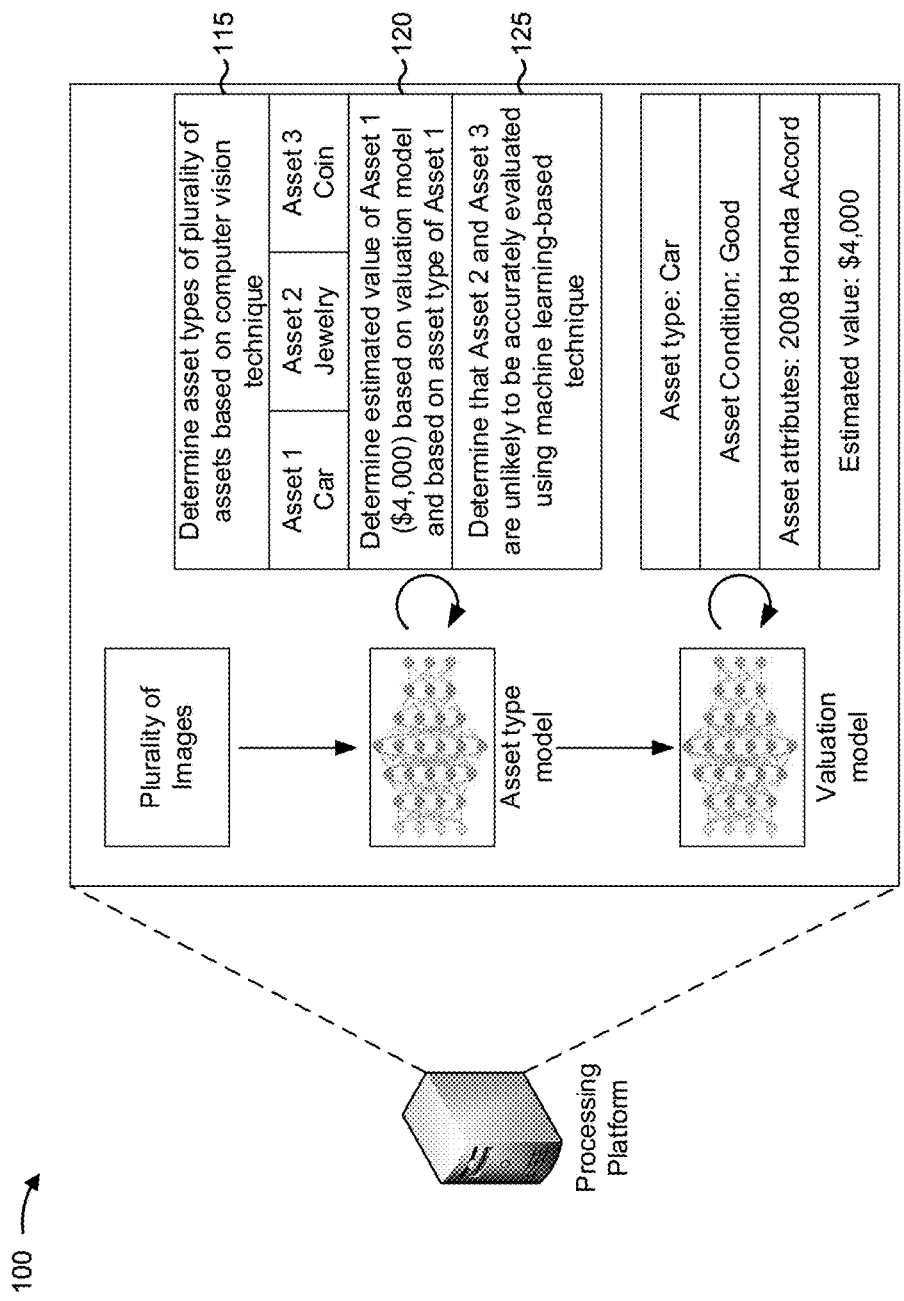

As shown in FIG. 1B, and by reference number 115, the processing platform may determine asset types of the plurality of assets. For example, the processing platform may determine the asset types using an asset type model. In some implementations, the processing platform may determine the asset types using a computer vision technique. For example, the processing platform may use the computer vision technique to extract image information from the plurality of images, and may apply an object recognition technique to identify asset types of the assets. As examples, the processing platform may determine an asset type of "car" for Asset 1, an asset type of "jewelry" for Asset 2, and an asset type of "coin" for Asset 3.

The processing platform may use a variety of granularities for the asset types. For example, Asset 1 could be classified as "vehicle," "car," "sedan," "classic car," "Honda," and so on. Assigning asset types at a lower granularity (e.g., classifying Asset 1 as a car asset type, rather than a Honda asset type) may conserve processing resources of the processing platform relative to assigning asset types at a higher granularity. Assigning asset types at the higher granularity may improve the accuracy of determination of estimated values, and may conserve computing resources that would otherwise be used to provide information identifying the asset to an unsuitable subject matter expert or to provide information identifying the asset to multiple subject matter experts associated with the asset type.

In some implementations, the asset type model may be a machine learning-based model. As one example, the asset type model may be based on a neural network, such as a convolutional neural network (CNN) and/or the like. In such a case, the asset type model may receive, as input, image data from the plurality of images. The asset type model may identify regions of interest (e.g., based on color similarity, texture similarity, size similarity, shape similarity, etc.), and may determine an asset type of an asset in the regions of interest. In some implementations, the asset type model may determine the asset types based on a support vector machine (SVM), which may be trained to classify assets. For example, for each asset type, the processing platform may train a binary SVM. In some implementations, other types of machine learning-based models may be used, such as a linear regression model and/or the like.

In some implementations, the asset type model may be a rules-based model. For example, the asset type model may be based on an edge detection model, an edge matching model, an appearance-based method, a divide-and-conquer search, a greyscale matching approach, a gradient matching approach, and/or the like. In such a case, the asset type model may be based on a static set of rules (e.g., an unchanging set of rules, a set of configured rules, and/or the like) or a semi-static set of rules (e.g., a set of rules that can be configured on the fly, a set of rules that is selected from multiple different sets of rules, and/or the like).

By identifying the asset type based on the asset type model, the processing platform may simplify the determination of estimated values using a computer-based approach. For example, the processing platform may determine whether an estimated value, determined using a machine learning-based technique, is likely to be accurate based on the asset type. The processing platform may perform the machine learning-based technique for assets of asset types that are likely to be accurately valued using the machine learning-based technique, and may perform another technique for assets of asset types that are unlikely to be accurately valued using the machine learning-based technique. This may conserve processing resources of the processing platform that would otherwise be used to perform the machine learning-based technique for assets that are unlikely to be accurately valued using the machine learning-based technique.

As shown by reference number 120, the processing platform may determine an estimated value of Asset 1 (e.g., the car) of $4,000 based on a valuation model (i.e., a machine learning-based technique) and based on an asset type of Asset 1. Furthermore, as shown by reference number 125, the processing platform may determine that Asset 2 and Asset 3 (e.g., the jewelry and the coin) are unlikely to be accurately evaluated using a machine learning-based technique (i.e., the valuation model). For example, the processing platform may determine that Asset 1 is associated with an asset type for which a machine learning-based technique is likely to provide an accurate estimated value, and may determine that Asset 2 and Asset 3 are associated with asset types for which a machine learning-based technique is unlikely to provide an accurate estimated value. The processing platform may selectively use the machine learning-based technique or may provide information identifying the assets to an asset evaluator based at least in part on these determinations.

In some implementations, the processing platform may determine whether a machine learning-based technique is to be used to determine an estimated value of an asset based on one or more rules. For example, the processing platform may store a set of rules that indicates which asset types are to be evaluated using the machine learning-based technique and which asset types are to be evaluated by the asset evaluators. In this case, the processing platform may compare the asset types of Assets 1 through 3 to the set of rules, and may determine that Asset 1 is to be evaluated using the machine learning-based technique and Assets 2 and 3 are to be evaluated by the asset evaluators. Using the rules-based approach may conserve processing resources in comparison to using a more sophisticated approach, such as a trial-and-error approach, described below.

In some implementations, the processing platform may determine whether a machine-learning based technique is to be used to determine an estimated value of an asset based on historical information. For example, the historical information may indicate whether a machine learning-based technique has generated an accurate estimated value for a particular asset type in the past. The historical information may be based on user feedback, a comparison of an estimated value to a realized value (e.g., a sale value, an appraised value, etc.), and/or the like. When the historical information indicates that the historical accuracy of the estimated value of an asset type satisfies a threshold for the machine learning-based technique, then the processing platform may use the machine learning-based technique to evaluate assets of the asset type. Otherwise, the processing platform may use the asset evaluator to evaluate the assets of the asset type. Using the historical value approach described above may conserve processing resources in comparison to using the trial-and-error approach described below.

In some implementations, the processing platform may determine whether a machine-learning based technique is to be used to evaluate an asset based on one or more attempts to evaluate the asset using the machine learning technique. For example, in some cases, the processing platform may use multiple, different machine learning-based techniques to evaluate an asset, or may perform multiple iterations of a machine learning-based technique. In these cases, the processing platform may determine whether a set of outputs (e.g., a set of estimated values of an asset) of the machine learning-based technique(s) are to be used to determine the estimated value based on the one or more outputs. For example, if the set of outputs are within a threshold range of each other or are associated with a confidence score that satisfies a threshold, then the processing platform may determine that the set of outputs are to be used to determine the estimated value (e.g., based on an average of the set of outputs, a highest value of the set of outputs, a lowest value of the set of outputs, a median value of the set of outputs, and/or the like). If the set of outputs are not within a threshold range of each other or are associated with a confidence score that does not satisfy the threshold, then the processing platform may determine the estimated value using the asset evaluator. Using the multiple outputs to determine whether a machine learning-based technique is to be used may enable the determination of whether a machine learning-based technique is likely to be accurate without using historical information or a set of rules.

In some implementations, the valuation model may be a machine learning-based model. For example, the processing platform may train the valuation model based on one or more parameters associated with images of assets that are to be evaluated, such as an asset type of the asset, a condition of the asset, a location associated with the asset, a chemical composition of the asset, user-specified information regarding the asset, and/or the like. The processing platform may train the valuation model using historical data associated with evaluating assets using images of the assets according to the one or more parameters. Using the historical data and the one or more parameters as inputs to the valuation model, the processing platform may determine an evaluation for an asset using the machine learning-based technique to enable more equitable asset allocation.

In some implementations, the valuation model may determine an estimated value of an asset (e.g., may evaluate the asset) based on one or more parameters associated with the asset. These parameters may be determined using the valuation model or may be inputs to the valuation model. Examples of parameters include a condition of an asset (e.g., like new, slightly used, used, no damage, some damage, heavily damaged, etc.), an age of an asset (e.g., based on an asset type of the asset, a year of purchase of the asset, a date associated with the asset, and/or the like), a location of an asset (e.g., based on context information for the asset and/or the like), and/or the like. More particularly, as shown in FIG. 1B, the parameters for Asset 1 include an asset type (e.g., car), an asset condition (e.g., good), and one or more asset attributes (e.g., a year, make, and model of the car of 2008 Honda Accord). By determining the parameters using the valuation model, user input regarding the asset may be reduced, thereby reducing the likelihood of an error based on the user input. By determining parameters based on user input or context information associated with an image, processing resources may be conserved that would otherwise be used to determine the parameters using the valuation model.

In some implementations, the processing platform may select an appropriate valuation model from a plurality of available valuation models. For example, a valuation model that is suitable for one asset type may not produce an accurate estimated value for another asset type. The processing platform may store or have access to a plurality of valuation models, and may select which valuation model is to be used based on the asset type of an asset. In this way, the processing platform may improve accuracy of evaluation of assets and reduce processor usage associated with the application of unsuitable models to determine an estimated value of an asset.

Figure 1C:
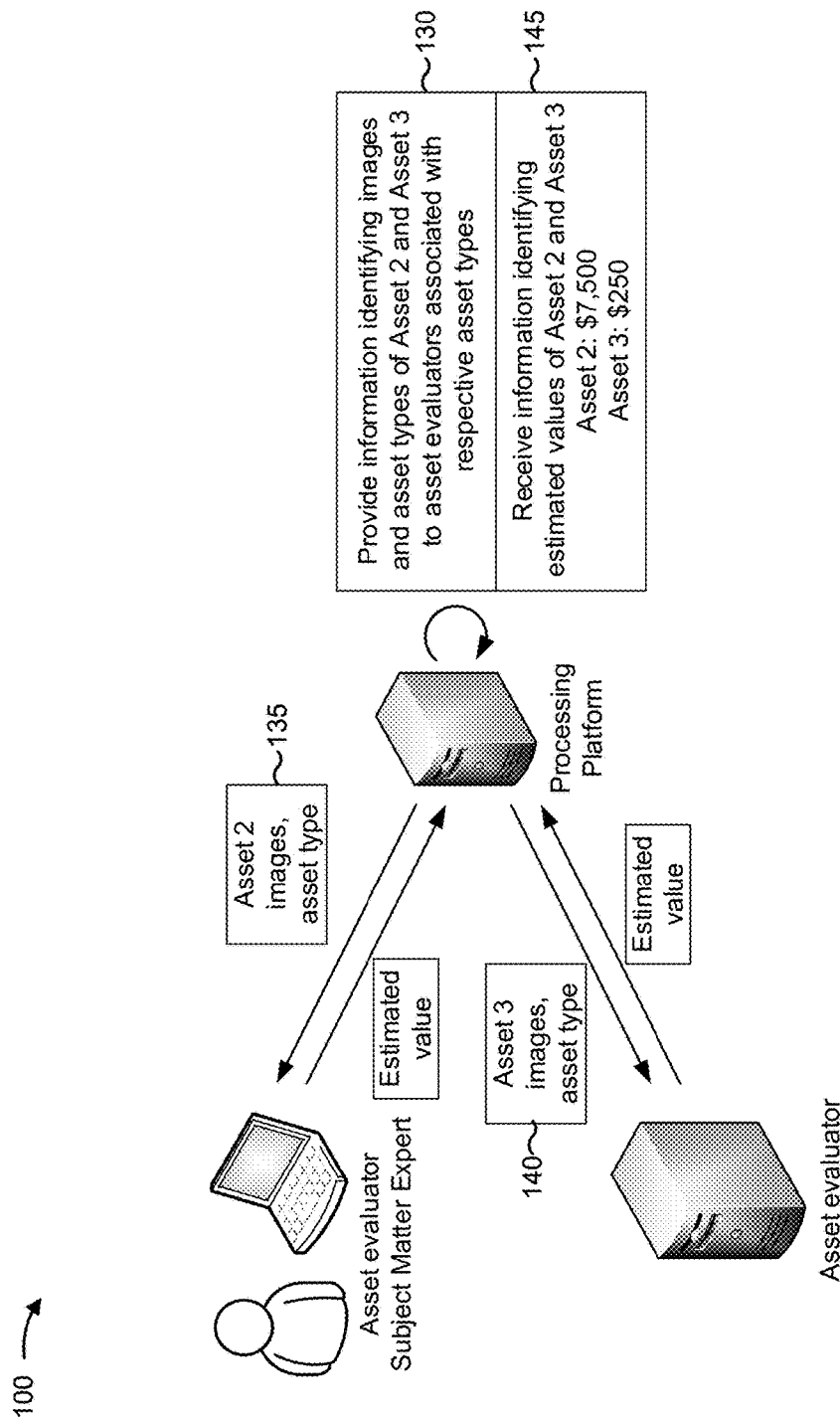

As shown in FIG. 1C, and by reference number 130, the processing platform may provide information identifying Assets 2 and 3 for determination of estimated values of Assets 2 and 3. For example, and as shown by reference numbers 135 and 140, the processing platform may provide the information identifying the images, asset types, and/or parameters associated with Assets 2 and 3 to respective asset evaluators that are associated with the respective asset types. An asset evaluator may be a device and/or may be associated with a subject matter expert. For example, in some cases, an asset evaluator device may automatically determine an estimated value based on the information identifying an asset. As examples, an asset evaluator device may perform a lookup using a set of parameters associated with a rare coin to determine an estimated value of the rare coin. By determining the estimated value using the asset evaluator device, processing resources of the processing platform may be conserved and accuracy of the estimated value may be improved in situations where determination of the estimated value using a machine learning-based model may be inaccurate or unreliable.

In some implementations, the processing platform may identify an appropriate asset evaluator for an asset. For example, the processing platform may identify an appropriate asset evaluator based on an asset type of an asset. This may be based on stored information indicating a mapping of asset evaluators and corresponding asset types of the asset evaluators (e.g., paintings are to be associated with a fine art asset evaluator, jewelry is to be associated with a jewelry asset evaluator, and so on). As another example, the processing platform may perform an Internet search query or a database search query based on an asset type to identify an appropriate asset evaluator, and may provide information identifying an asset to the appropriate asset evaluator.

As shown by reference number 145, the processing platform may receive information identifying estimated values of Asset 2 and Asset 3. For example, the processing platform may receive information identifying an estimated value of Asset 2 of $7,500 and an estimated value of Asset 3 of $250. In some implementations, the processing platform may receive information identifying estimated values of an asset from multiple, different asset evaluators. For example, the processing platform may provide information identifying an asset to multiple, different asset evaluators, and may determine an estimated value based on responses from the multiple, different asset evaluators (e.g., based on an average estimated value, a highest estimated value, a lowest estimated value, a median estimated value, and/or the like). This may improve accuracy of the estimated value and/or reduce the impact of an outlier estimate.

Figure 1D:
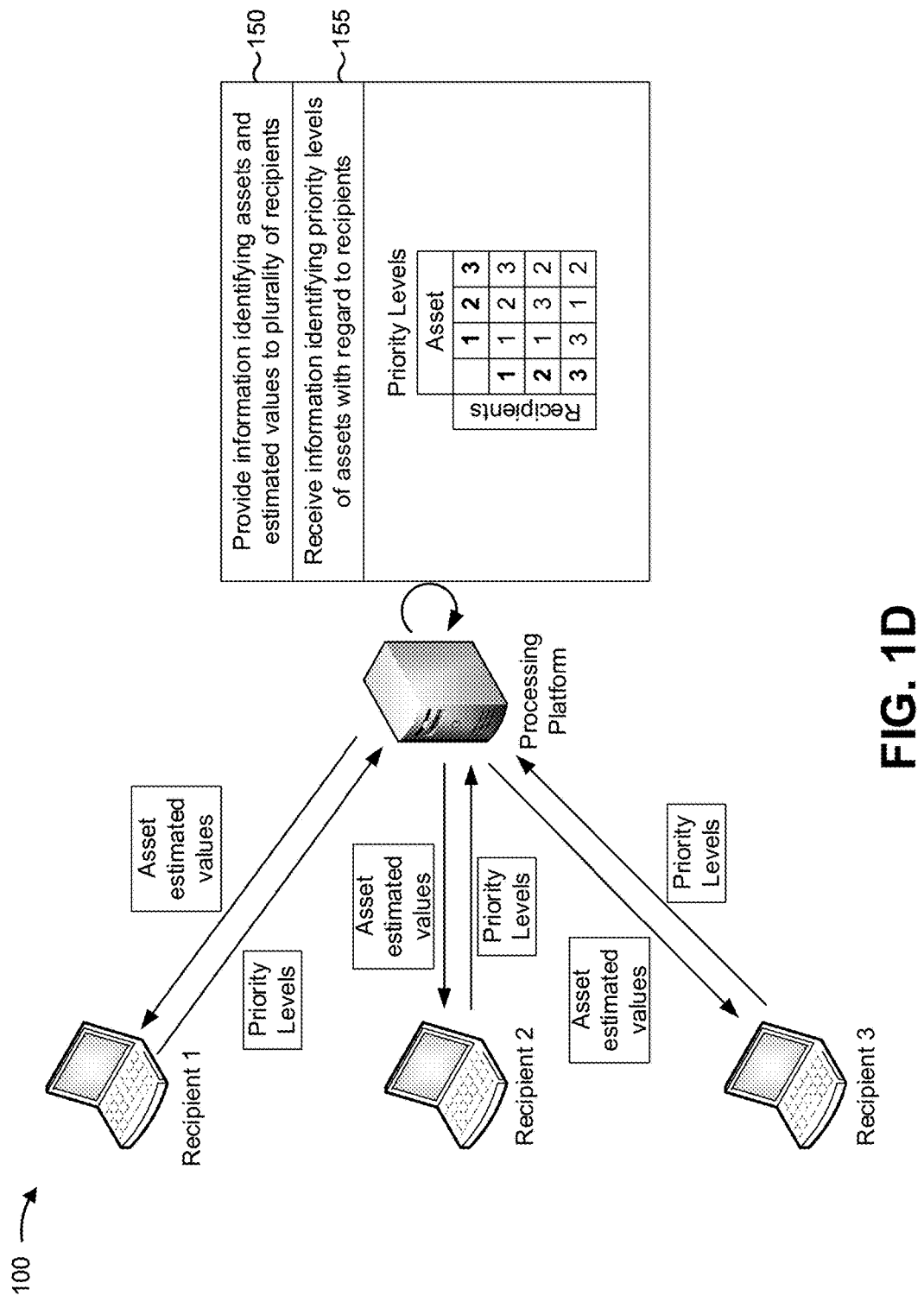

As shown in FIG. 1D, and by reference number 150, the processing platform may provide information identifying the assets and the estimated values to a plurality of recipients. For example, the recipients may be associated with an asset allocation to be performed for the assets based on the estimated values. In some implementations, the processing platform may identify the plurality of recipients based on an input from an administrator, an indication of interest from the recipients, a relationship between an owner of the asset and the recipients, and/or the like.

As shown by reference number 155, the processing platform may receive information identifying bids or priority levels of the assets. For example, the recipients may provide information identifying the bids or priority levels for each asset of the plurality of assets. As further shown, in some cases, the priority levels may indicate rankings of each asset by each recipient. For example, Asset 1 is assigned a highest rank by Recipients 1 and 2, Asset 2 is assigned a highest rank by Recipient 3, and so on. The ranks may be used to determine an asset allocation of Assets 1, 2, and 3, as described in more detail below. In some implementations, the priority levels may be based on the recipients' desire to be allocated a particular asset. In some implementations, the priority levels may not necessarily use a ranked-choice system. For example, the processing platform may receive, from a recipient, information identifying a group of assets in which the recipient is interested. As another example, the processing platform may receive an indication that the recipient is interested in receiving one or more assets (e.g., any one or more assets of the set of assets, a subset of assets of the set of assets, all assets of the set of assets, and/or the like).

Figure 1E:
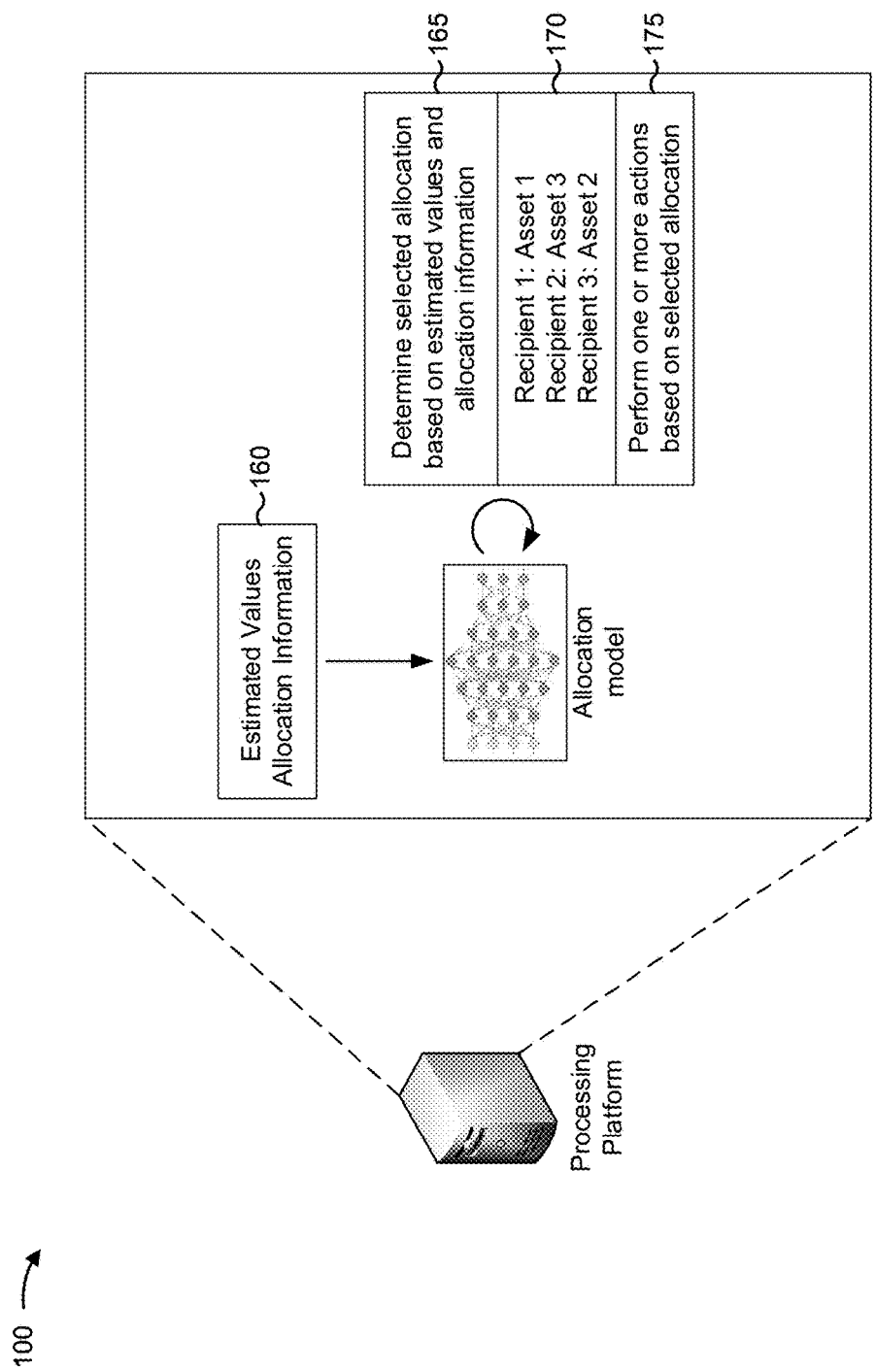

As shown in FIG. 1E, and as shown by reference number 160, the processing platform may input information identifying the estimated values and the allocation information (e.g., the information identifying the priority levels and/or other information) to an allocation model. As shown by reference number 165, the processing platform may determine a selected allocation for the assets using the allocation model (e.g., based on the information identifying the estimated values and the allocation information). In this case, as shown by reference number 170, Asset 1 is allocated to Recipient 1, Asset 2 is allocated to Recipient 3, and Asset 3 is allocated to Recipient 2.

The allocation model may receive information identifying estimated values of a set of assets and allocation information, and may output information identifying a selected allocation. As shown the selected allocation may identify a recipient of each asset of the set of assets. In some implementations, the allocation model may be trained using a machine learning process. For example, the processing platform may train the allocation model based on one or more parameters associated with allocating the set of assets, such as estimated values of the set of assets, allocation information associated with the set of assets, and/or the like. The processing platform may train the allocation model using historical data associated with allocating assets based on estimated values and allocation information according to the one or more parameters. Using the historical data and the one or more parameters as inputs to the allocation model, the processing platform may allocate the set of assets to respective recipients. Using the machine learning-based allocation model may conserve resources that would otherwise be used to define a rigid rules-based model, and may enable the iterative updating of the allocation model (e.g., based on feedback from the recipients or a decision maker regarding the selected allocation).

In some implementations, the allocation model may be an optimization model. For example, the allocation model may optimize the allocation of the estimated values (e.g., to achieve a uniform distribution among recipients) and the allocation information associated with the estimated values (e.g., the priority levels and/or the like). In such a case, the allocation model may be a vector optimization model, a multi-object optimization model, a Pareto optimization model, and/or the like. Using an optimization model may conserve processor resources that would otherwise be used to train and/or use a machine learning-based model for the allocation model.

As shown by reference number 175, the processing platform may perform one or more actions based on the selected allocation. For example, the processing platform may provide information identifying the selected allocation to the recipients. As a second example, the processing platform may provide information identifying the selected allocation to a decision maker. In such a case, the processing platform may receive information indicating that the selected allocation is acceptable, or may receive one or more modifications to the selected allocation (e.g., a change to a priority level, a change to an aggregate value to be assigned to one or more recipients, etc.). In such a case, the processing platform may generate an updated selected allocation (e.g., using the allocation model), and may perform one or more actions based on the updated selected allocation.

In some implementations, the processing platform may generate a document based on the selected allocation. For example, the processing platform may generate a will (e.g., a testament) or a part of a will based on the selected allocation. The will or the part of the will may indicate the assets of the selected allocation and the recipients corresponding to the assets. In this way, the processing platform may determine an equitable distribution of assets based on estimated values of the assets and priority levels indicated by potential recipients of the assets. Furthermore, the processing platform may determine the estimated values at least partially using a machine learning-based technique, thereby reducing user input and improving accuracy of the estimated values.

In this way, implementations described herein may conserve computational resources (e.g., processing resources and/or the like) that would otherwise be used to attempt a machine learning-based asset value determination for an asset that is unlikely to be accurately valued using the machine learning-based asset value determination. Furthermore, implementations described herein may conserve computing resources that would otherwise be used to receive and process user interactions identifying inaccurate asset values. Even further, several different stages of the process for asset value determination based on machine learning are automated, which may improve speed and efficiency of the process. Furthermore, implementations described herein use a rigorous, computerized process to perform tasks or roles that were not previously performed. For example, previously, a technique did not exist to determine whether asset values can be accurately determined using a machine learning-based technique or to determine an asset value based on a machine learning-based technique.

As indicated above, FIGS. 1A-1E are provided merely as an example. Other examples may differ from what was described with regard to FIGS. 1A-1E.

Figure 2:
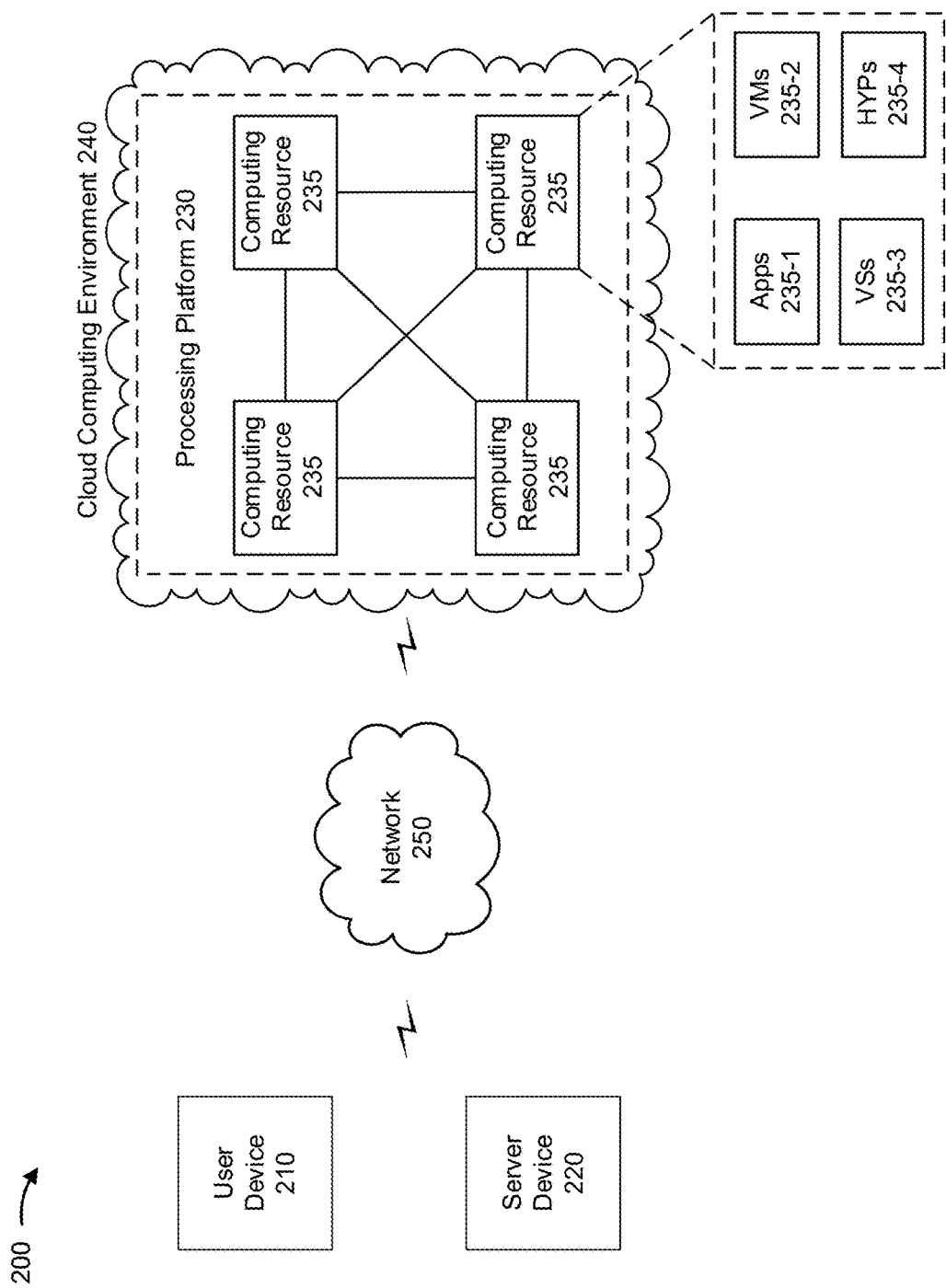
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a processing platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing an image or video of an asset, context information associated with an asset, a priority level associated with an asset, and/or the like. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may include an image capture device. In some implementations, user device 210 may be an asset evaluator or may be associated with an asset evaluator.

Server device 220 includes one or more devices capable of storing, processing, and/or routing information associated with determining an estimated value of an asset and/or an asset allocation for a set of assets. In some implementations, server device 220 may provide transaction information and/or entity information to processing platform 230. In some implementations, server device 220 may include a communication interface that allows server device 220 to receive information from and/or transmit information to other devices in environment 200. In some implementations, server device 220 may be an asset evaluator or may be associated with an asset evaluator.

Processing platform 230 includes one or more computing resources assigned to analysis of image data for assets to determine estimated values of the assets and/or a suggested allocation of the assets. For example, processing platform 230 may be a platform implemented by cloud computing environment 240 that may analyze image data for assets to determine estimated values of the assets and/or a suggested allocation of the assets. In some implementations, processing platform 230 is implemented by computing resources 235 of cloud computing environment 240.

Processing platform 230 may include a server device or a group of server devices. In some implementations, processing platform 230 may be hosted in cloud computing environment 240. Notably, while implementations described herein describe processing platform 230 as being hosted in cloud computing environment 240, in some implementations, processing platform 230 may not be cloud-based or may be partially cloud-based.

Cloud computing environment 240 includes an environment that delivers computing as a service, whereby shared resources, services, etc. may be provided to processing platform 230. Cloud computing environment 240 may provide computation, software, data access, storage, and/or other services that do not require end-user knowledge of a physical location and configuration of a system and/or a device that delivers the services. As shown, cloud computing environment 240 may include processing platform 230 and computing resource 235.

Computing resource 235 includes one or more personal computers, workstation computers, server devices, or another type of computation and/or communication device. In some implementations, computing resource 235 may host processing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with processing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
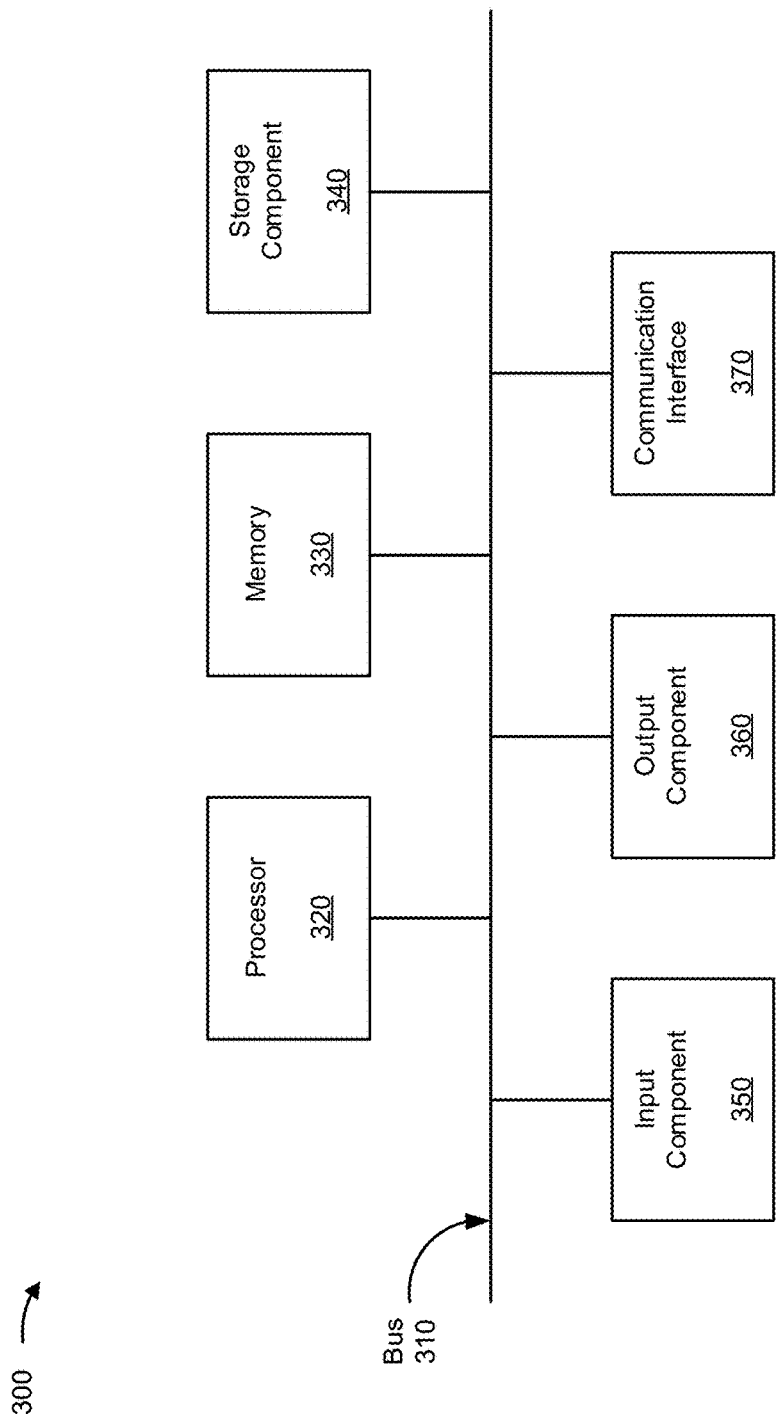
FIG. 3 is a diagram of example components of one or more devices of FIG. 2.

FIG. 3 is a diagram of example components of a device 300. Device 300 may correspond to user device 210, server device 220, processing platform 230, and/or computing resource 235. In some implementations, user device 210, server device 220, processing platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
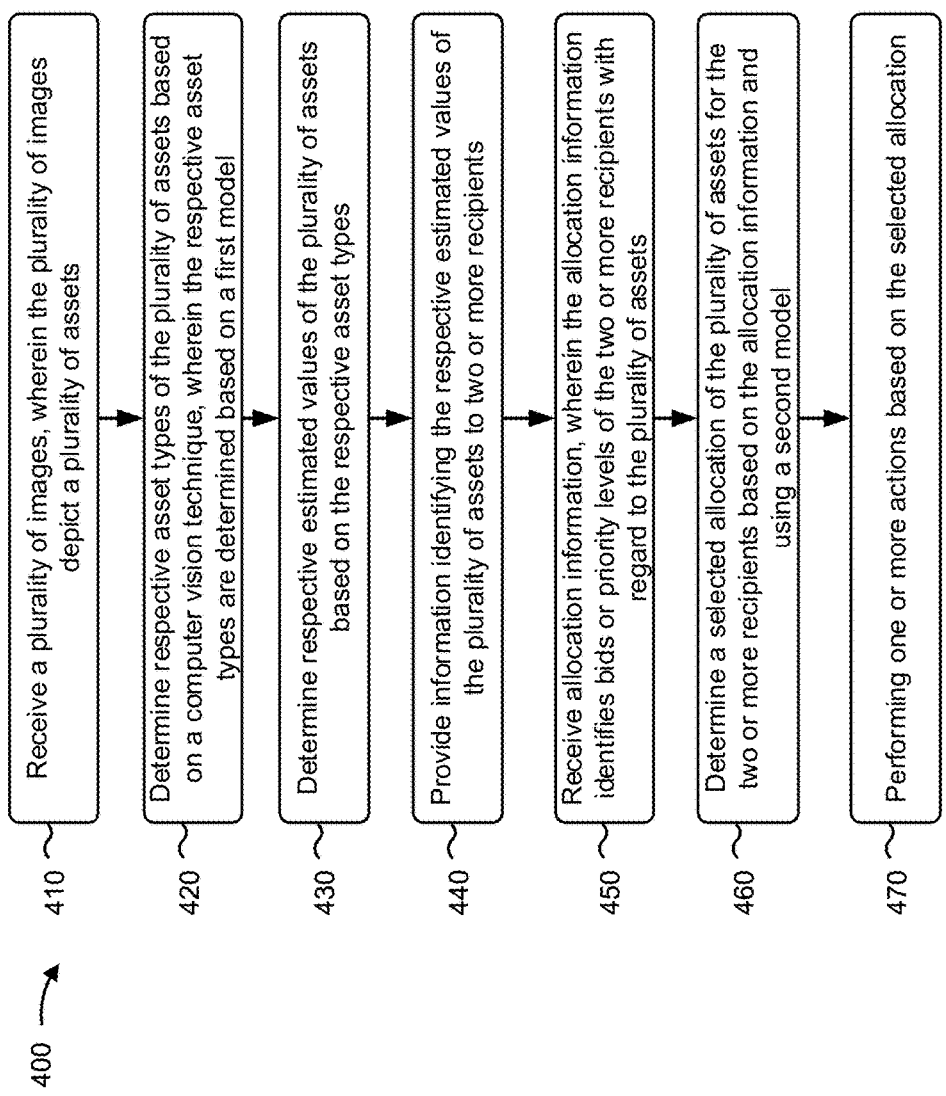
FIGS. 4-6 are flow charts of example processes for computer vision based asset evaluation.

FIG. 4 is a flow chart of an example process 400 for computer vision based asset evaluation. In some implementations, one or more process blocks of FIG. 4 may be performed by a processing platform (e.g., processing platform 230). In some implementations, one or more process blocks of FIG. 4 may be performed by another device or a group of devices separate from or including the processing platform, such as a user device (e.g., user device 210), a server device (e.g., server device 220), an asset evaluator, and/or the like.

As shown in FIG. 4, process 400 may include receiving a plurality of images, wherein the plurality of images depict a plurality of assets (block 410). For example, the processing platform (e.g., using processor 320, memory 330, storage component 340, input component 350, communication interface 370, and/or the like) may receive a plurality of images. The plurality of images may depict a plurality of assets, as described above.

As further shown in FIG. 4, process 400 may include determining respective asset types of the plurality of assets based on a computer vision technique, wherein the respective asset types are determined based on a first model (block 420). For example, the processing platform (e.g., using processor 320, memory 330, storage component 340, and/or the like) may determine respective asset types of the plurality of assets based on a computer vision technique. In some implementations, the respective asset types are determined based on a first model that receives, as input, information determined based on the computer vision technique, and that outputs information identifying the respective asset types.

As further shown in FIG. 4, process 400 may include determining respective estimated values of the plurality of assets based on the respective asset types (block 430). For example, the processing platform (e.g., using processor 320, memory 330, storage component 340, and/or the like) may determine respective estimated values of the plurality of assets based on the respective asset types, as described above.

As further shown in FIG. 4, process 400 may include providing information identifying the respective estimated values of the plurality of assets to two or more recipients (block 440). For example, the processing platform (e.g., using processor 320, memory 330, storage component 340, output component 360, communication interface 370 and/or the like) may provide information identifying the respective estimated values of the plurality of assets to two or more recipients, as described above.

As further shown in FIG. 4, process 400 may include receiving allocation information, wherein the allocation information identifies bids or priority levels of the two or more recipients with regard to the plurality of assets (block 450). For example, the processing platform (e.g., using processor 320, input component 350, communication interface 370 and/or the like) may receive allocation information. In some aspects, the allocation information identifies bids or priority levels of the two or more recipients with regard to the plurality of assets.

As further shown in FIG. 4, process 400 may include determining a selected allocation of the plurality of assets for the two or more recipients based on the allocation information and using a second model (block 460). For example, the processing platform (e.g., using processor 320, memory 330, storage component 340, and/or the like) may determine a selected allocation of the plurality of assets for the two or more recipients based on the allocation information and using a second model. In some implementations, the second model receives, as input, at least one of the respective estimated values or the allocation information. In some implementations, the second model outputs the selected allocation.

As further shown in FIG. 4, process 400 may include performing one or more actions based on the selected allocation (block 470). For example, the processing platform (e.g., using processor 320, memory 330, storage component 340, input component 350, output component 360, communication interface 370, and/or the like) may perform one or more actions based on the selected allocation, as described above.

Process 400 may include additional implementations, such as any single implementation or any combination of implementations described below and/or in connection with one or more other processes described elsewhere herein.

In some implementations, the processing platform may determine a condition of an asset, of the plurality of assets, using the computer vision technique. In some implementations, an estimated value of the asset is determined based on the condition. In some implementations, the processing platform may generate a document based on the selected allocation. In some implementations, the document identifies the selected allocation and the two or more recipients.

In some implementations, the processing platform may provide, to a user device, information identifying the selected allocation; and receive, from the user device, information identifying a modified allocation. In some implementations, the document is based on the modified allocation.

In some implementations, the processing platform may provide, to a user device, an image, of the plurality of images, that is associated with an asset of the plurality of assets; and receive information identifying an estimated value, of the respective estimated values, for the asset. In some implementations, the image is provided to an entity associated with an asset type of the asset. In some implementations, determining the respective estimated values further comprises: selectively providing an image, of the plurality of images, that is associated with an asset of the plurality of assets, for determination of an estimated value, of the respective estimated values, or determining the estimated value of the asset using a model, wherein selectively providing the image or determining the estimated value of the asset using the model is based on an asset type of the asset.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
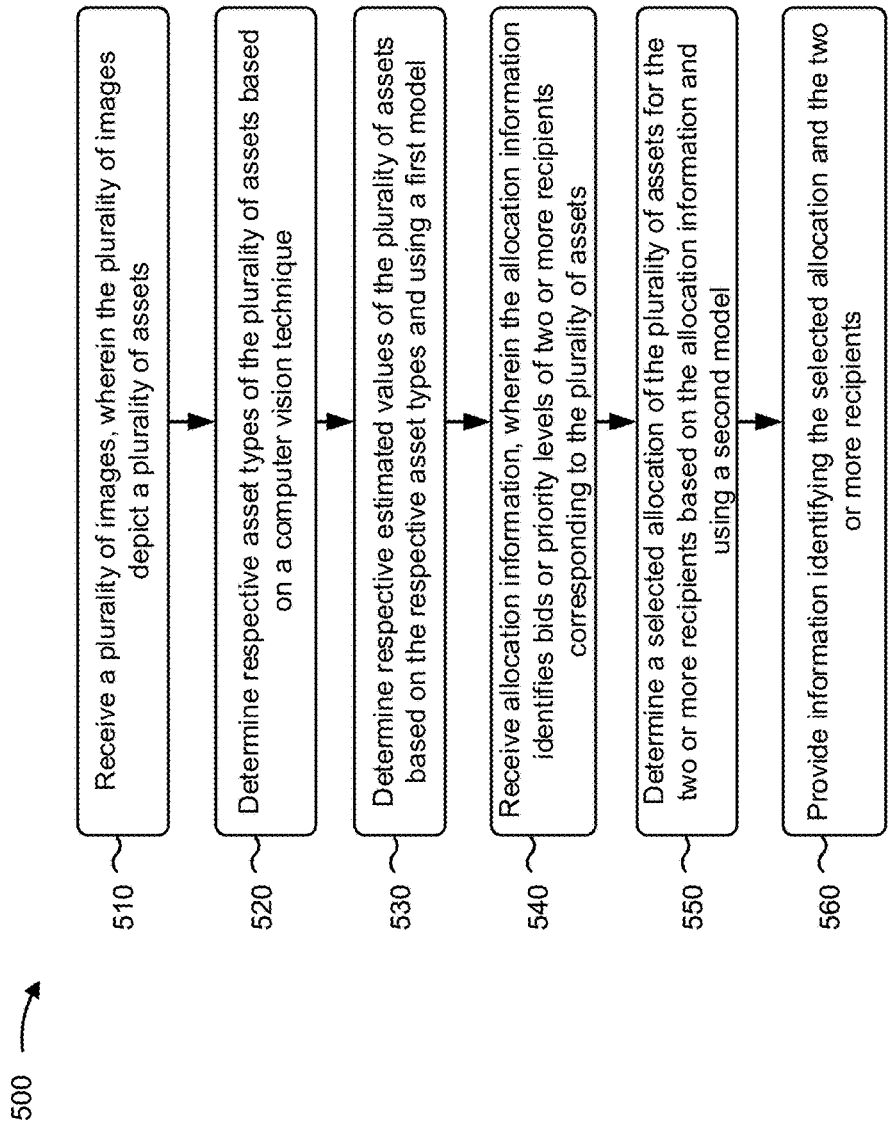

FIG. 5 is a flow chart of an example process 500 for computer vision based asset evaluation. In some implementations, one or more process blocks of FIG. 4 may be performed by a processing platform (e.g., processing platform 230). In some implementations, one or more process blocks of FIG. 5 may be performed by another device or a group of devices separate from or including the processing platform, such as a user device (e.g., user device 210), a server device (e.g., server device 220), an asset evaluator, and/or the like.

As shown in FIG. 5, process 500 may include receiving a plurality of images, wherein the plurality of images depict a plurality of assets (block 510). For example, the processing platform (e.g., using processor 320, memory 330, storage component 340, input component 350, communication interface 370, and/or the like) may receive a plurality of images. The plurality of images may depict a plurality of assets, as described above.

As further shown in FIG. 5, process 500 may include determining respective asset types of the plurality of assets based on a computer vision technique (block 520). For example, the processing platform (e.g., using processor 320, memory 330, storage component 340, and/or the like) may determine respective asset types of the plurality of assets based on a computer vision technique, as described above. In some implementations, the processing platform may determine the respective asset types using an asset type model, as described above.

As further shown in FIG. 5, process 500 may include determining respective estimated values of the plurality of assets based on the respective asset types and using a first model (block 530). For example, the processing platform (e.g., using processor 320, memory 330, storage component 340, and/or the like) may determine respective estimated values of the plurality of assets based on the respective asset types, as described above. The processing platform may determine the respective estimated values using a first model. The first model may be the valuation model, as described above.

As further shown in FIG. 5, process 500 may include receiving allocation information, wherein the allocation information identifies bids or priority levels of two or more recipients corresponding to the plurality of assets (block 540). For example, the processing platform (e.g., using processor 320, input component 350, communication interface 370 and/or the like) may receive allocation information. In some aspects, the allocation information identifies bids or priority levels of two or more recipients with regard to the plurality of assets.

As further shown in FIG. 5, process 500 may include determining a selected allocation of the plurality of assets for the two or more recipients based on the allocation information and using a second model (block 550). For example, the processing platform (e.g., using processor 320, memory 330, storage component 340, and/or the like) may determine a selected allocation of the plurality of assets for the two or more recipients based on the allocation information and using a second model. In some implementations, the second model receives, as input, at least one of the respective estimated values or the allocation information. In some implementations, the second model outputs the selected allocation. In some implementations, the second model may be the allocation model described above.

As further shown in FIG. 5, process 500 may include providing information identifying the selected allocation and the two or more recipients (block 560). For example, the processing platform (e.g., using processor 320, memory 330, storage component 340, input component 350, output component 360, communication interface 370, and/or the like) may provide information identifying the selected allocation and the two or more recipients, as described above.

Process 500 may include additional implementations, such as any single implementation or any combination of implementations described below and/or in connection with one or more other processes described elsewhere herein.

In some implementations, the processing platform may train the first model using a machine learning technique. In some implementations, the first model is trained using a training set of assets, asset types, and estimated values.

In some implementations, the processing platform may train the second model using a machine learning technique. In some implementations, the second model is trained using a training set of estimated values, allocation information, and corresponding selected allocations.

In some implementations, the processing platform may identify one or more attributes of an asset, of the plurality of assets. In some implementations, the processing platform may determine an estimated value of the asset based on the one or more attributes using the first model.

In some implementations, the information identifying the selected allocation and the two or more recipients indicates two or more sets of assets, of the plurality of assets, that are allocated to respective recipients of the two or more recipients.

In some implementations, the processing platform may determine a condition associated with an asset, of the plurality of assets, using the computer vision technique. In some implementations, an estimated value of the asset is determined based on the condition.

In some implementations, the processing platform may determine a plurality of potential allocations including the selected allocation. In some implementations, the processing platform may provide information identifying the plurality of potential allocations. In some implementations, the processing platform may receive information indicating that the selected allocation is selected and generate a document based on the selected allocation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
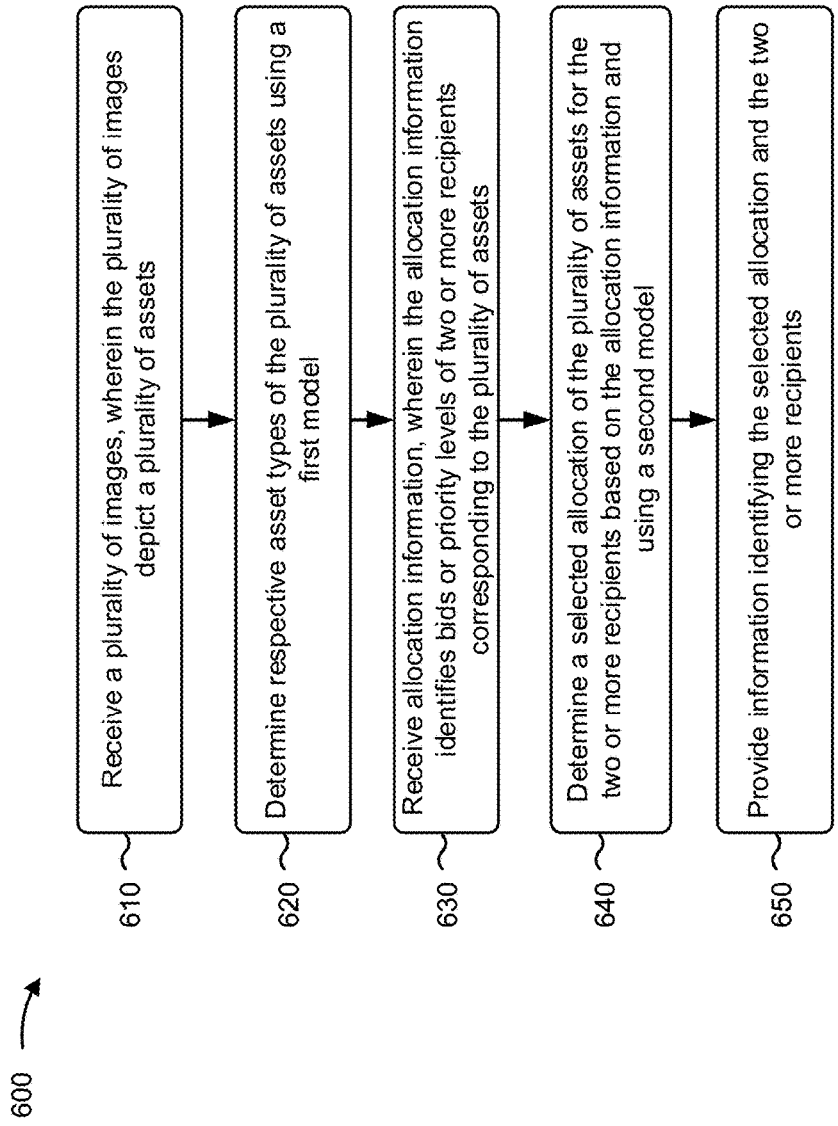

FIG. 6 is a flow chart of an example process 600 for computer vision based asset evaluation. In some implementations, one or more process blocks of FIG. 4 may be performed by a processing platform (e.g., processing platform 230). In some implementations, one or more process blocks of FIG. 6 may be performed by another device or a group of devices separate from or including the processing platform, such as a user device (e.g., user device 210), a server device (e.g., server device 220), an asset evaluator, and/or the like.

As shown in FIG. 6, process 600 may include receiving a plurality of images, wherein the plurality of images depict a plurality of assets (block 610). For example, the processing platform (e.g., using processor 320, memory 330, storage component 340, input component 350, communication interface 370, and/or the like) may receive a plurality of images. The plurality of images may depict a plurality of assets, as described above.

As further shown in FIG. 6, process 600 may include determining respective asset types of the plurality of assets using a first model (block 620). For example, the processing platform (e.g., using processor 320, memory 330, storage component 340, and/or the like) may determine respective asset types of the plurality of assets based on a computer vision technique, as described above. In some implementations, the processing platform may determine the respective asset types using an asset type model, as described above.

As further shown in FIG. 6, process 600 may include receiving allocation information, wherein the allocation information identifies bids or priority levels of two or more recipients corresponding to the plurality of assets (block 630). For example, the processing platform (e.g., using processor 320, input component 350, communication interface 370 and/or the like) may receive allocation information.

In some aspects, the allocation information identifies bids or priority levels of two or more recipients with regard to the plurality of assets.

As further shown in FIG. 6, process 600 may include determining a selected allocation of the plurality of assets for the two or more recipients based on the allocation information and using a second model (block 640). For example, the processing platform (e.g., using processor 320, memory 330, storage component 340, and/or the like) may determine a selected allocation of the plurality of assets for the two or more recipients based on the allocation information and using a second model. In some implementations, the second model receives, as input, at least one of the respective estimated values or the allocation information. In some implementations, the second model outputs the selected allocation. In some implementations, the second model may be the allocation model described above.

As further shown in FIG. 6, process 600 may include providing information identifying the selected allocation and the two or more recipients (block 650). For example, the processing platform (e.g., using processor 320, memory 330, storage component 340, input component 350, output component 360, communication interface 370, and/or the like) may provide information identifying the selected allocation and the two or more recipients, as described above.

Process 600 may include additional implementations, such as any single implementation or any combination of implementations described below and/or in connection with one or more other processes described elsewhere herein.

In some implementations, the processing platform may generate a will, a testament, or a trust based on the information identifying the selected allocation and the two or more recipients. In some implementations, the processing platform may determine that one or more images of an asset fail to satisfy a threshold based on a quality of the one or more images. In some implementations, the processing platform may provide a request for one or more additional images of the asset based on determining that the one or more images of the asset fail to satisfy the threshold.

In some implementations, the processing platform may determine an estimated value, of the respective estimated values, of an asset, of the plurality of assets, based on a user input regarding the asset. In some implementations, the processing platform may determine that an estimated value, of the respective estimated values, of an asset, of the plurality of assets, cannot be determined using the first model. In some implementations, the processing platform may provide a request for information identifying an estimated value of the asset. In some implementations, the respective estimated values are based on market values of the plurality of assets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a plurality of images,
      wherein the plurality of images depict a plurality of assets;
   determining, by the device, respective asset types of the plurality of assets based on a computer vision technique,
      wherein the respective asset types are determined based on a first model that receives, as input, information determined based on the computer vision technique, and that outputs information identifying the respective asset types;
   determining, by the device, respective estimated values of the plurality of assets based on the respective asset types;
   providing, by the device, information identifying the respective estimated values of the plurality of assets to two or more recipients;
   receiving, by the device, allocation information,
      wherein the allocation information identifies bids or priority levels of the two or more recipients with regard to the plurality of assets;
   determining, by the device, a selected allocation of the plurality of assets for the two or more recipients based on the allocation information and using a second model,
      wherein the second model receives, as input, at least one of:
         the respective estimated values, or
         the allocation information, and
      wherein the second model outputs the selected allocation; and
   performing, by the device, one or more actions based on the selected allocation.

2. The method of claim 1, further comprising:
   determining a condition of an asset, of the plurality of assets, using the computer vision technique,
      wherein an estimated value of the asset is determined based on the condition.

3. The method of claim 1, further comprising:
   generating a document based on the selected allocation,
      wherein the document identifies the selected allocation and the two or more recipients.

4. The method of claim 3, further comprising:
   providing, to a user device, information identifying the selected allocation; and
   receiving, from the user device, information identifying a modified allocation,
      wherein the document is based on the modified allocation.

5. The method of claim 1, wherein determining the respective estimated values further comprises:
   providing, to a user device, an image, of the plurality of images, that is associated with an asset of the plurality of assets; and
   receiving information identifying an estimated value, of the respective estimated values, for the asset.

6. The method of claim 5, wherein the image is provided to an entity associated with an asset type of the asset.

7. The method of claim 1, wherein determining the respective estimated values further comprises:
   selectively:
      providing an image, of the plurality of images, that is associated with an asset of the plurality of assets, for determination of an estimated value, of the respective estimated values, or
      determining the estimated value of the asset using a model,
         wherein selectively providing the image or determining the estimated value of the asset using the model is based on an asset type of the asset.

8. A device, comprising:
   one or more memories; and
   one or more processors, communicatively coupled to the one or more memories, configured to:
      receive a plurality of images,
         wherein the plurality of images depict a plurality of assets;
      determine respective asset types of the plurality of assets based on a computer vision technique;
      determine respective estimated values of the plurality of assets based on the respective asset types and using a first model;
      receive allocation information,
         wherein the allocation information identifies bids or priority levels of two or more recipients corresponding to the plurality of assets;

determine a selected allocation of the plurality of assets for the two or more recipients based on the allocation information and using a second model,
wherein the second model receives, as input, the respective estimated values and the allocation information, and
wherein the second model outputs the selected allocation; and
provide information identifying the selected allocation and the two or more recipients.

9. The device of claim 8, wherein the one or more processors are to:
train the first model using a machine learning technique,
wherein the first model is trained using a training set of assets, asset types, and estimated values.

10. The device of claim 8, wherein the one or more processors are to:
train the second model using a machine learning technique,
wherein the second model is trained using a training set of estimated values, allocation information, and corresponding selected allocations.

11. The device of claim 8, wherein the one or more processors are to:
identify one or more attributes of an asset, of the plurality of assets; and
wherein the one or more processors, when determining respective estimated values of the plurality of assets based on the respective asset types, are further to:
determine an estimated value of the asset based on the one or more attributes using the first model.

12. The device of claim 8, wherein the information identifying the selected allocation and the two or more recipients indicates two or more sets of assets, of the plurality of assets, that are allocated to respective recipients of the two or more recipients.

13. The device of claim 8, wherein the one or more processors are to:
determine a condition associated with an asset, of the plurality of assets, using the computer vision technique,
wherein an estimated value of the asset is determined based on the condition.

14. The device of claim 8, wherein the one or more processors, when determining the selected allocation, are further to:
determine a plurality of potential allocations including the selected allocation; and
wherein the one or more processors, when providing the information identifying the selected allocation, are further to:
provide information identifying the plurality of potential allocations; and
wherein the one or more processors are further to:
receive information indicating that the selected allocation is selected; and
generate a document based on the selected allocation.

15. A non-transitory computer-readable medium storing instructions, the instructions comprising:
one or more instructions that, when executed by one or more processors, cause the one or more processors to:
receive a plurality of images,
wherein the plurality of images depict a plurality of assets;
determine respective estimated values of the plurality of assets using a first model,
wherein the respective estimated values are determined based on respective asset types of the plurality of assets,
wherein the respective asset types are determined using a computer vision technique;
receive allocation information,
wherein the allocation information identifies bids or priority levels of two or more recipients corresponding to the plurality of assets;
determine a selected allocation of the plurality of assets for the two or more recipients based on the allocation information and using a second model,
wherein the second model receives, as input, the respective estimated values and the allocation information, and
wherein the second model outputs the selected allocation; and
provide information identifying the selected allocation and the two or more recipients.

16. The non-transitory computer-readable medium of claim 15, wherein the one or more instructions, when executed by the one or more processors, further cause the one or more processors to:
generate a will, a testament, or a trust based on the information identifying the selected allocation and the two or more recipients.

17. The non-transitory computer-readable medium of claim 15, wherein the one or more instructions, when executed by the one or more processors, further cause the one or more processors to:
determine that one or more images of an asset fail to satisfy a threshold based on a quality of the one or more images; and
provide a request for one or more additional images of the asset based on determining that the one or more images of the asset fail to satisfy the threshold.

18. The non-transitory computer-readable medium of claim 15, wherein the one or more instructions, that cause the one or more processors to determine the respective estimated values, cause the one or more processors to:
determine an estimated value, of the respective estimated values, of an asset, of the plurality of assets, based on a user input regarding the asset.

19. The non-transitory computer-readable medium of claim 15, wherein the one or more instructions, when executed by the one or more processors, further cause the one or more processors to:
determine that an estimated value, of the respective estimated values, of an asset, of the plurality of assets, cannot be determined using the first model; and
provide a request for information identifying an estimated value of the asset.

20. The non-transitory computer-readable medium of claim 15, wherein the respective estimated values are based on market values of the plurality of assets.

* * * * *